United States Patent
Lin et al.

(10) Patent No.: US 8,641,253 B2
(45) Date of Patent: Feb. 4, 2014

(54) LIGHT GUIDE DEVICE AND BACKLIGHT MODULE

(75) Inventors: Hao-Xiang Lin, Taoyuan (TW);
Yan-Zuo Chen, Taoyuan (TW);
Wen-Feng Cheng, Taoyuan (TW);
Jui-Hsiang Chang, Taoyuan (TW)

(73) Assignee: Entire Technology Co., Ltd., Taoyuan County (TW)

( * ) Notice: Subject to any disclaimer, the term of this patent is extended or adjusted under 35 U.S.C. 154(b) by 447 days.

(21) Appl. No.: 13/111,774

(22) Filed: May 19, 2011

(65) Prior Publication Data

US 2012/0140516 A1 Jun. 7, 2012

(30) Foreign Application Priority Data

Dec. 1, 2010 (TW) ................................ 99141620 A

(51) Int. Cl.
*F21V 8/00* (2006.01)
*F21V 5/02* (2006.01)

(52) U.S. Cl.
USPC ........... 362/607; 362/608; 362/620; 362/621; 362/626

(58) Field of Classification Search
USPC .......................... 362/607, 608, 618, 621, 626
See application file for complete search history.

(56) References Cited

U.S. PATENT DOCUMENTS

| 7,128,459 | B2 * | 10/2006 | Igarashi et al. | 362/621 |
| 7,350,957 | B2 * | 4/2008 | Liao | 362/621 |
| 8,491,172 | B2 * | 7/2013 | Hong et al. | 362/608 |
| 2007/0159848 | A1 * | 7/2007 | Yang et al. | 362/608 |

FOREIGN PATENT DOCUMENTS

TW    I328702 B1    8/2010

* cited by examiner

*Primary Examiner* — David V Bruce

(74) *Attorney, Agent, or Firm* — Alan Kamrath; Kamrath IP Lawfirm, P.A.

(57) ABSTRACT

The backlight module comprises a light guide device, pluralities of light sources and at least one optical film. The light guide device further contains body, first microstructures, second microstructures, flat portions and diffusive beads. The first microstructures are disposed on reflective surface. A first point and a second point are disposed at two ends of the first microstructure with a first width ($P_1$). Each flat portion has a gap (G) defined between two adjacent first microstructures. The second microstructure connects to the body by means of two edge portions. Two edge portions have a second width ($P_2$) defined on the incident surface; wherein a first depth ($H_1$) is defined to be the distance between the crossing point of two edge portions away from the incident surface. Pluralities of diffusive beads have weight $M_b$. The body has weight $M_r$. Then the equations of $$\frac{H_1}{P_2} * \frac{P_1}{G} \le 0.288$$

and $$\frac{H_1}{P_2} * \frac{P_1}{G} * \frac{M_r}{M_b} \le 96.0$$

are satisfied.

21 Claims, 15 Drawing Sheets

LIGHT GUIDE DEVICE AND BACKLIGHT MODULE

FIELD OF THE INVENTION

The present invention relates to a light guide device and a backlight module, particularly to the light guide device with better diffusive efficiency and the backlight module which utilize the light guide device thereof.

DESCRIPTION OF THE PRIOR ART

In recent year, due to the cheaper and cheaper price of the Liquid Crystal Display (LCD), the monitor has gradually come into vogue in home TV and computer display. Besides, because of its thinness and light characters comparative to cathode-ray-tube television, the LCD has become more and more favorable and thus easily seen in public such as station, hospital, convenient store or theater. Those LCDs not only can be utilized to deliver message, but also can achieve some advertising purpose. Therefore, the usage and application of LCD will be wider and wider.

The LCD normally contains a liquid crystal panel and a backlight module. The backlight module is commonly categorized as bottom-type backlight module and edge-type backlight module according to the size of the panel. In general, edge-type backlight module may be utilized in small size LCD so as to achieve lower cost and space saving.

Conventionally, the backlight module contains light source disposed at side of a light guide device, so that light ray may be emitted and then entered the light guide device from side surface of the light guide device. Afterward, the optical path may be directed to the emitting surface by means of microstructures of the light guide device. After emitted from the light guide device, the light ray may leave the backlight module and then pass through a diffusive film and a Brightness Enhancing Film (BEF), which is commonly named optical film. In this manner, the light ray may be mixed so as to achieve diffusion by means of the diffusive film.

However, the diffusive film and BEF of those optical films are normally costly, as high as 30~40% of entire backlight module, so that it could significantly squeeze the profit of the industries. What if the light guide device having function of diffusion seems like a big idea, so that the optical film might be abandoned and therefore the cost could be reduced? So how to achieve the diffusive function is an urgent problem needed to be settled.

SUMMARY OF THE INVENTION

The primary object of present invention is to reduce the manufacturing cost of the backlight module as well as having the premise of without decreasing the optical efficiency.

To achieve the foregoing and other objects, a light guide device is provided. The light guide device comprises a body, pluralities of first microstructures, pluralities of second microstructures, pluralities of flat portions and pluralities of diffusive beads. The body has an emitting surface, a reflective surface and an incident surface. The reflective surface and the emitting surface are correspondingly disposed on the light guide device. The incident surface is connected to a side of the reflective surface and the emitting surface. The first microstructures are disposed on the reflective surface. Each first microstructure has a first point and a second point defined in cross section, wherein the same first microstructure connects to the reflective surface by means of the first point and the second point. The corresponding first point and second point are disposed at two ends of the first microstructure with a first width ($P_1$). Each flat portion is disposed between two adjacent first microstructures and has a gap (G) defined between the same two first microstructures. Each second microstructure has a base portion and two edge portions defined in cross section. Two ends of the base portion are respectively tangent to two edge portion. The second microstructure connects to the incident surface by means of two edge portions. The corresponding two edge portions have a second width ($P_2$) defined on the incident surface, wherein a first depth ($H_1$) is defined to be the distance between the crossing point of two edge portions away from the incident surface. The diffusive beads having weight $M_b$ spreads inside the body which has weight $M_t$, wherein the equations of $$\frac{H_1}{P_2} * \frac{P_1}{G} \leq 0.288$$

and $$\frac{H_1}{P_2} * \frac{P_1}{G} * \frac{M_t}{M_b} \leq 96.0$$

are satisfied.

To achieve the foregoing and other objects, a backlight module is provided. The backlight module comprises a light guide device, pluralities of light sources and at least one optical film. The light sources are disposed with approximately in a line and may emit the light ray so as to form an optical path. The light guide device further contains a body, pluralities of first microstructures, pluralities of second microstructures, pluralities of flat portions and pluralities of diffusive beads. The body has an emitting surface, a reflective surface and an incident surface. The reflective surface and the emitting surface are correspondingly disposed on the light guide device. The incident surface is connected to a side of the reflective surface and the emitting surface. The first microstructures are disposed on the reflective surface. Each first microstructure has a first point and a second point defined in cross section wherein the same first microstructure connects to the reflective surface by means of the first point and the second point. The corresponding first point and second point are disposed at two ends of the first microstructure with a first width ($P_1$). Each flat portion is disposed between two adjacent first microstructures and has a gap (G) defined between the same two first microstructures. Each second microstructure has a base portion and two edge portions defined in cross section. Two ends of the base portion are respectively tangent to two edge portion. The second microstructure connects to the incident surface by means of two edge portions. The corresponding two edge portions have a second width ($P_2$) defined on the incident surface; wherein a first depth ($H_1$) is defined to be the distance between the crossing point of two edge portions away from the incident surface. Pluralities of diffusive beads which have weight $M_b$ spread inside the body which has weight $M_t$, wherein the equations of $$\frac{H_1}{P_2} * \frac{P_1}{G} \leq 0.288$$

and $$\frac{H_1}{P_2} * \frac{P_1}{G} * \frac{M_t}{M_b} \leq 96.0$$

are satisfied. Whereby the light sources are disposed at side of the incident surface and the optical film is disposed at side of the emitting surface, so that the optical path passes through the light guide device and the optical film in order.

In the aforementioned light guide device or backlight module, wherein the first microstructure extend on a first direction, the emitting surface containing pluralities of third microstructures extending a third direction; wherein the first direction and the third direction are not parallel.

In the aforementioned light guide device or backlight module, wherein the light guide device contains pluralities of light sources disposed at side of the incident surface with approximately in a line, the light source having a length $L_1$ and two adjacent light sources having an interval $L_2$, wherein the equation of $$\frac{H_1}{P_2} * \frac{P_1}{G} * \frac{M_t}{M_b} * \frac{L_2}{L_1} \leq 91.94$$

is satisfied; the second microstructure could extend on a second direction and pluralities of light sources could be disposed in a fourth direction, wherein the second direction and the fourth direction could be parallel or orthogonal; the second microstructures could be twisted disposed along with the second direction.

In the aforementioned light guide device or backlight module, wherein the base portion is curved shaped, or the edge portion is straight.

In the aforementioned light guide device or backlight module, wherein the base portion is circular arc and has expanding angle ($\gamma$) between 60~110 degree.

In the aforementioned light guide device or backlight module, wherein the light guide device has a second depth ($H_2$) defined to be the projecting length from the edge portion to the normal line of the incident surface; wherein $$\frac{H_1}{P_2} * \frac{P_1}{G} * \frac{M_t}{M_b} * \frac{H_2}{H_1} \leq 86.4$$

and $$0 \leq \frac{H_2}{H_1} \leq 1.0$$

are satisfied.

In the aforementioned light guide device or backlight module, wherein the first microstructures are dilute arranged in neighboring of the light source.

In the aforementioned light guide device or backlight module, wherein the first microstructures are concave or protruded structures, and the second microstructures are concave or protruded structures.

Whereby, the light guide device and backlight module of present invention do not have necessary to equip with optical film, and then still could have function of light diffusion and mixing. In this manner, the brightness and dimness alternately revealed (some called "Hot Spot phenomenon") in the light guide device or backlight module may be significantly reduced or even diminished.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
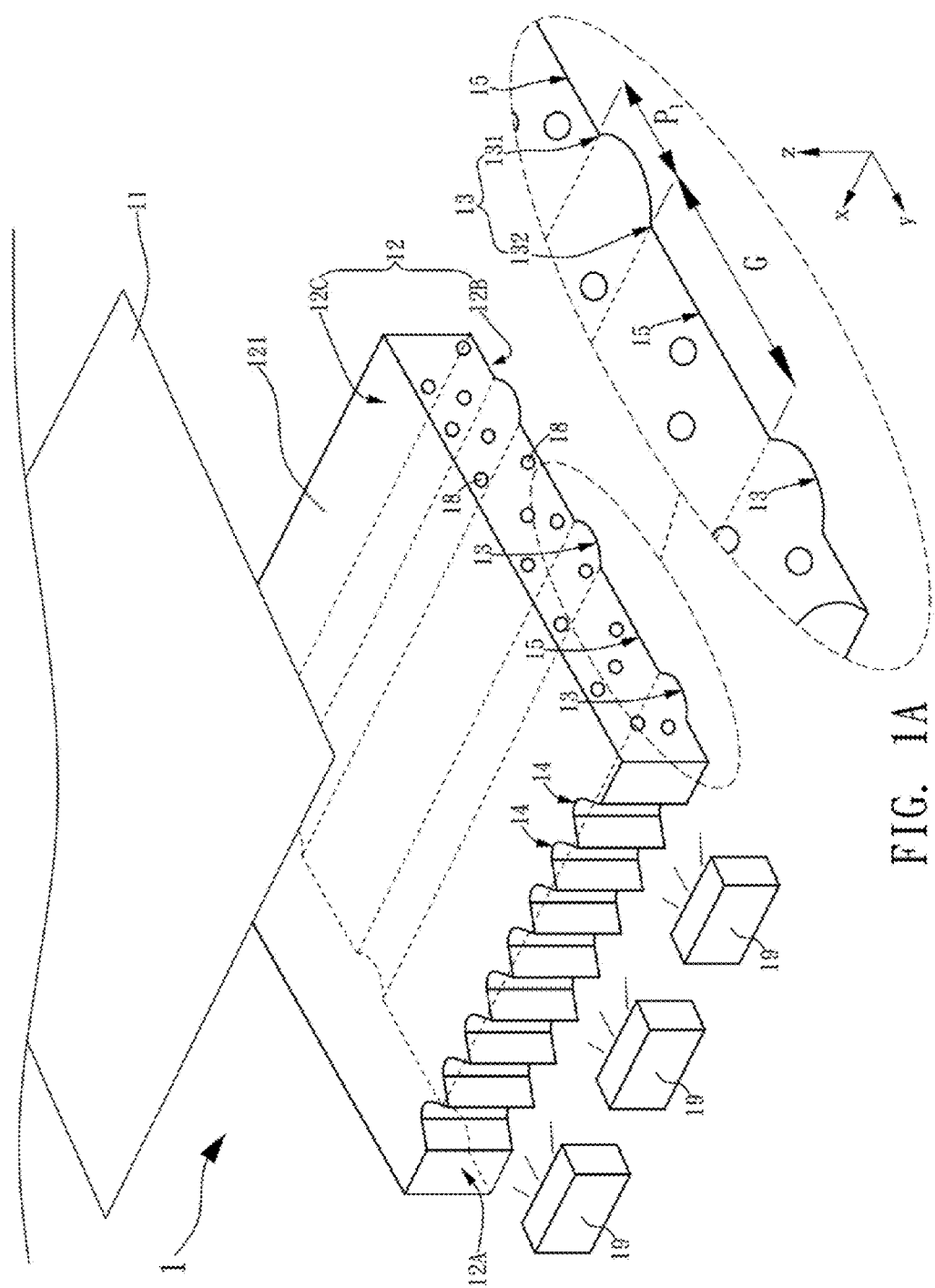
FIG. 1A is diagram of light guide device and backlight module according, to the first embodiment of present invention.

Please refer to FIG. 1A, FIG. 1A is diagram of light guide device and backlight module according to the first embodiment of present invention. As shown in FIG. 1A, a backlight module 1 comprises a light guide device 12, pluralities of light sources 19 and an optical film 11. The optical film 11, could be optional disposed, is diffusive film or Brightness Enhancing Film (BEF). The light guide device 12 contains a body 121, an emitting surface 12C, a reflective surface 12B and an incident surface 12A. The emitting surface 12C is disposed at top of the body 121, and the reflective surface 12B is disposed at beneath of the body 121; therefore the reflective surface 12B and the emitting surface 12C are both and correspondingly disposed on the light guide device 12. The incident surface 12A is connected to a side of the reflective surface 12B and the emitting surface 12C. The light sources 19 are disposed at side of the incident surface 12A and with approximately in a line. The light sources 19 may emit the light ray so as to form an optical path. The light ray emitted from the light sources 19 may pass the incident surface 12A and the body 121, so as to be delivered inside the light guide device 12. The optical film 11 could be optionally disposed at side of the emitting surface 12C.

The light guide device 12 further contains pluralities of first microstructures 13, pluralities of second microstructures 14, pluralities of flat portions 15 and pluralities of diffusive beads 18. Those first microstructures 13 are disposed upon the reflective surface 12B. In the case of present embodiment, those first microstructures 13 are protruded configuration. In other cases, those first microstructures 13 could be other configuration, such as concave shaped. As shown in the enlarged diagram of the FIG. 1A, the first microstructure 13 further define a first point 131 and a second point 132 in cross sectional view. The first microstructure 13 connects to the reflective surface 12B by means of the first point 131 and the second point 132, and thus the corresponding first point 131 and second point 132 are disposed at two ends of the first microstructure 13 with a first width ($P_1$). Each flat portion 15 is disposed between two adjacent first microstructures 13 and has a gap (G) defined between the same two first microstructures 13. Pluralities of second microstructures 14 are disposed on side of the light guide device 12, so as to connect the incident surface 12A. Pluralities of diffusive beads 18 have weight ($M_b$) and are spread inside the body 121. The body 121 has weight ($M_t$). In preferable embodiment, the density of the diffusive beads 18 spread is higher in the neighboring of the emitting surface 12C or the reflective surface 12B than the average density of the entire body 121. In this manner, better optical efficiency could be therefore achieved. Besides, the first microstructures 13 are dilute arranged in neighboring of the light source 19. Pluralities of second microstructures 14 are concave-shaped column, wherein each second microstructure 14 straightly extends on a second direction (Z-axis). Pluralities of light sources 19 are arranged in a line approximately along with a fourth direction (X-axis). In this diagram, the second, direction (Z-axis) and the fourth direction (X-axis) are orthogonal to each other.

Figure 1B:
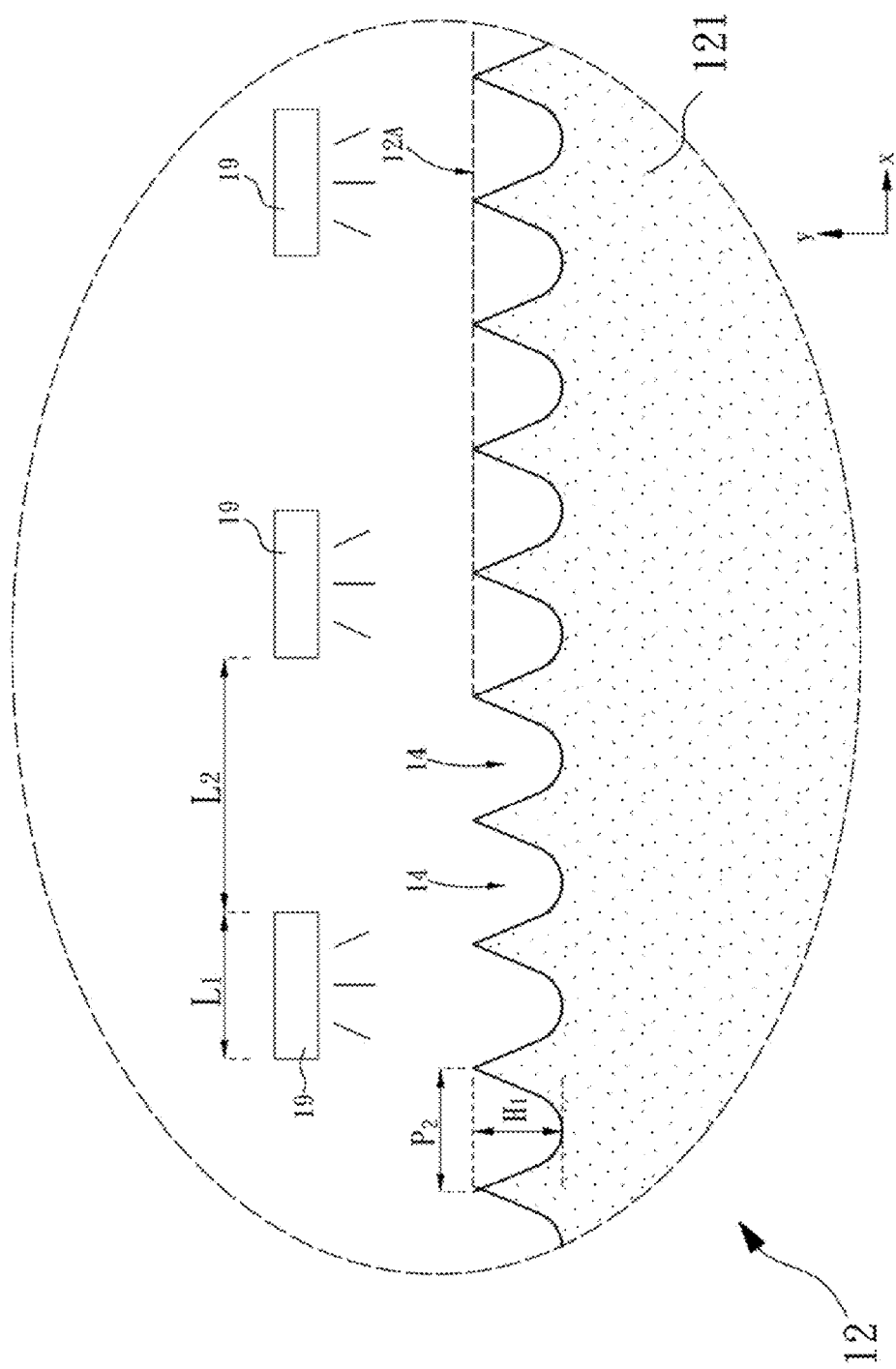
FIG. 1B is positional diagram of the light guide device and light source according to the first embodiment of present invention.
Figure 1C:
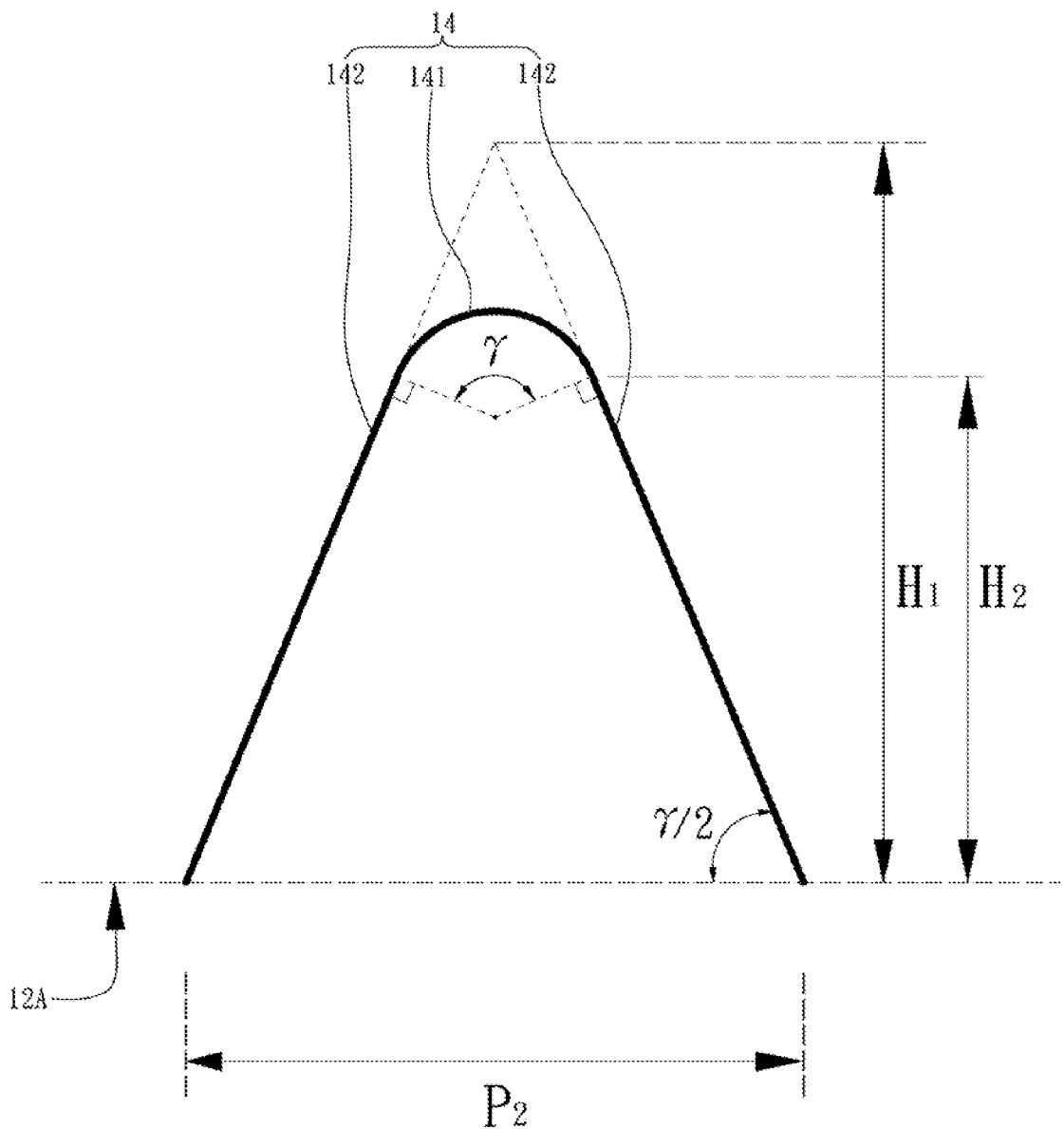
FIG. 1C is diagram of the second microstructure according to the first embodiment of present invention.

Please simultaneously refer to FIG. 1B and FIG. 1C, FIG. 1B is positional diagram of the light guide device and light source according to the first embodiment of present invention; FIG. 1C is diagram of the second microstructure according to the first embedment of present invention. As shown in FIG. 1B~1C, pluralities of second microstructures 14 are concave to incident surface 12A. Each second microstructure 14 has a base portion 141 and two edge portions 142 defined in cross section. In present embodiment, the base portion 141 is circular arc; the edge portion 142 is straight. Two ends of the base portion 141 are respectively tangent to two edge portions 142. The second microstructure 14 connects to the incident surface 12A by means of two edge portions 142. The corresponding two edge portions 142 have a second width ($P_2$) defined on the incident surface 12A, wherein the second width ($P_2$) is the distance between distinct two contact sites of edge portion 142 and the incident surface 12A. A first depth ($H_1$) is defined to be the distance between the crossing point of two edge portions 142 away from the incident surface 12A. Furthermore, as shown in FIG. 1B, the light source 19 has a length $L_1$ in horizontal direction, and two adjacent light sources 19 have an interval $L_2$.

As shown in FIG. 1C, two edge portions 142 of the second microstructure 14 are both tangent to the base portion 141. The base portion 141 is circular arc, and have an expanding angle ($\gamma$). A second depth ($H_2$) is defined to be the projecting length from the edge portion 142 to the normal line of the incident surface 12A.

Figure 8A:
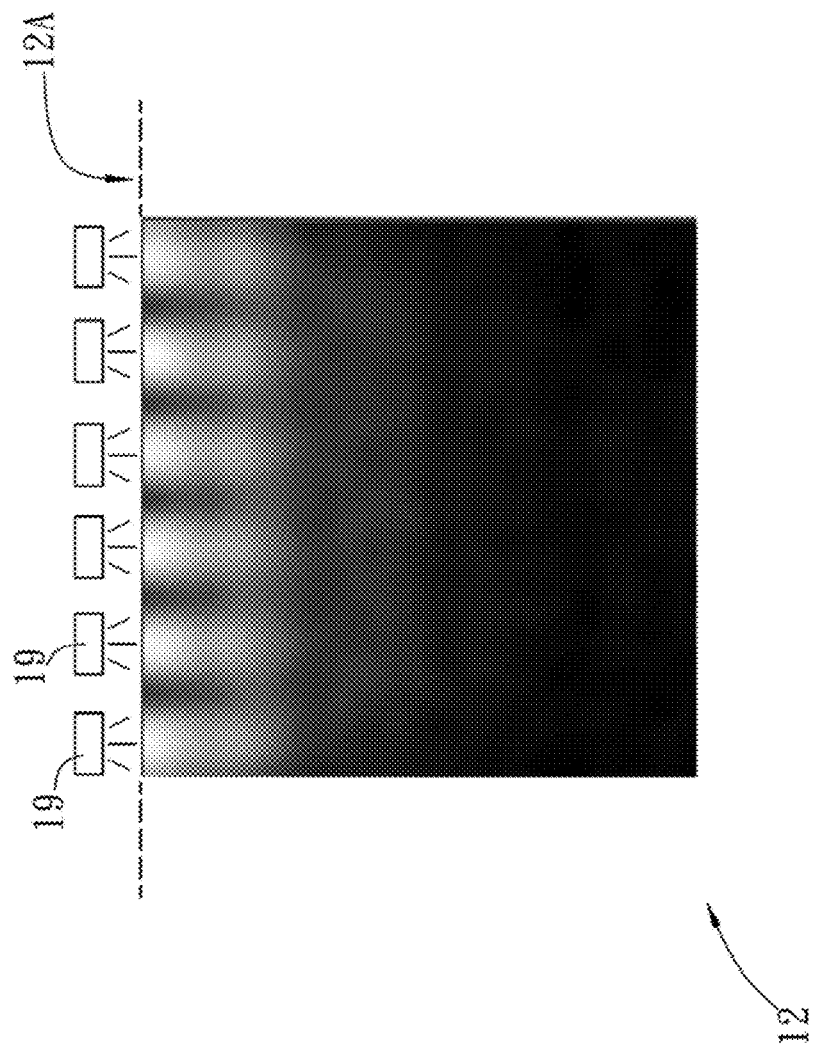
FIG. 8A is diagram of light guide device having brightness and dimness alternately.

In order to demonstrate the optical efficiency of the light guide device of present invention, the experiments regarding to light intensity or brightness of the light guide device 12 and light source 19 depicted in FIG. 1A are carried out. Notably, all of experiments are progressed without any optical film 11. As shown in FIG. 8A, brightness and dimness alternately revealed (some called "Hot Spot phenomenon") around the incident surface 12A is normally happened when pluralities of light sources 19 emit light ray to the light guide device 12. In this manner, poor visual result may be presented.

Figure 8B:
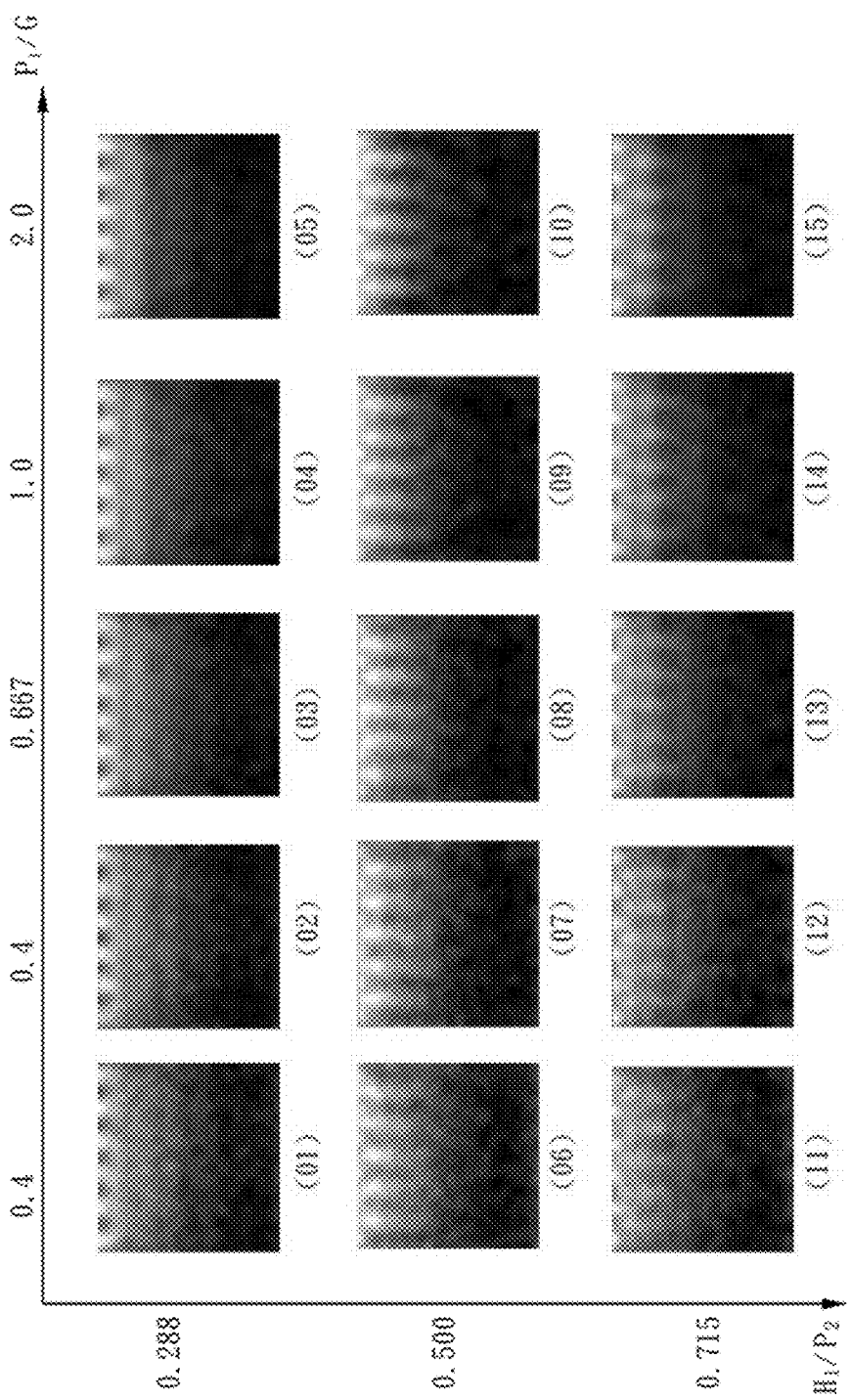
FIG. 8B is experimental result diagram of distinct $P_1/G$ values to brightness and dimness alternately.

In order to conquer the problem of the "Hot Spot phenomenon", so as to increase the visual effectiveness and product grade, some optimum arrangement for distinct variables are fulfilled. The variables could be combined, so that the potential optimization for optical efficiency may be achieved. Please refer to FIG. 8B, FIG. 8B is experimental result diagram of distinct $P_1/G$ values to brightness and dimness alternately. As shown in FIG. 8B, the horizontal axis represents the value of $P_1/G$, which respectively reveals 0.4, 0.5, 0.667, 1.0 and 2.0; the vertical axis represents the value of $H_1/P_2$ of the second microstructures 14, which respectively reveals 0.288, 0.5 and 0.715. Then, the optical result of $P_1/G$ value versus $H_1/P_2$ value are plotted, so that existence concerning "Hot Spot phenomenon" can be shown in set (01)~(15), totally fifteen sets. As shown in FIG. 8B, when the value of $H_1/P_2$ is equal to 0.288, set (01), (02), (03) and (04) have better diffusive effectiveness, so that it could pass the quality examination. When the value of $H_1/P_2$ is equal to 0.5, only set (06) and set (07) have better diffusive effectiveness. When the value of $H_1/P_2$ is equal to 0.715, only set (11) remained to have better diffusive effectiveness. In this manner, the "Hot Spot phenomenon" is likely not happen if the value of $H_1/P_2$ is smaller than 0.288, so that the first depth $H_1$ and second width $P_2$ of the second microstructures 14 may therefore play an important role.

Figure 8C:
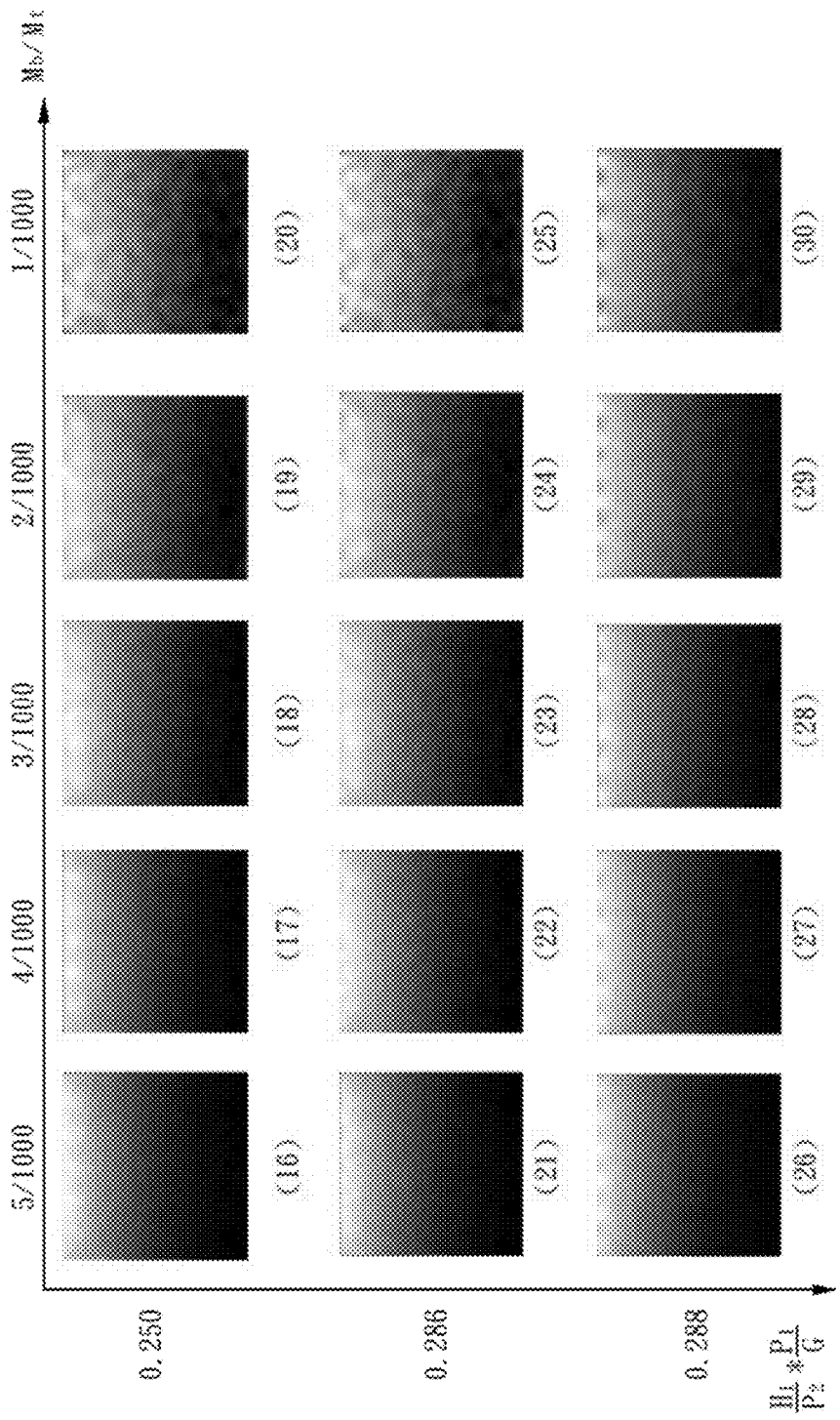
FIG. 8C is experimental result diagram of distinct $M_b/M_t$ values to brightness and dimness alternately.

Next, please refer to FIG. 8C, FIG. 8C is experimental result diagram of distinct $M_b/M_t$ values to brightness and dimness alternately. As shown in FIG. 8C, the horizontal axis represents the value of $M_b/M_t$, which respectively reveals 5/1000, 4/1000, 3/1000, 2/1000 and 1/1000; the vertical axis represents the value of $$\frac{H_1}{P_2} * \frac{P_1}{G},$$

which respectively reveals 0.25, 0.286 and 0.288. Then, the optical result of $M_b/M_t$ value versus $$\frac{H_1}{P_2} * \frac{P_1}{G}$$

value are plotted, so that existence concerning "Hot Spot phenomenon" can be shown in set (16)~(30), totally fifteen sets. As shown in FIG. 8C, when the value of $$\frac{H_1}{P_2} * \frac{P_1}{G}$$

is smaller than 0.288 and then the value of $M_b/M_t$ is greater than 3/1000, set (16)~(18), set (21)~(23) and set (26)~(28), totally nine sets, may have better diffusive effectiveness, so that it could pass the quality examination.

Namely:

$$\rightarrow \frac{H_1}{P_2} * \frac{P_1}{G} \le 0.288 \qquad \text{(I)}$$

$$\rightarrow \frac{M_b}{M_t} \ge 0.003 \rightarrow \frac{M_t}{M_b} \le 333.33 \qquad \text{(II)}$$

then multiply equation (I) and (II):

$$\rightarrow \frac{H_1}{P_2} * \frac{P_1}{G} * \frac{M_t}{M_b} \le 96.0 \qquad \text{(III)}$$

In the experimental results and aforementioned mathematical derivation, it is shown that the light guide device 12 may have better diffusive effectiveness and could pass quality examination without any further installation of optical film 11 (including diffusive film or BEF) if the equations of $$\frac{H_1}{P_2} * \frac{P_1}{G} \leq 0.288$$

and $$\frac{H_1}{P_2} * \frac{P_1}{G} * \frac{M_t}{M_b} \leq 96.0$$

are satisfied.

Figure 8D:
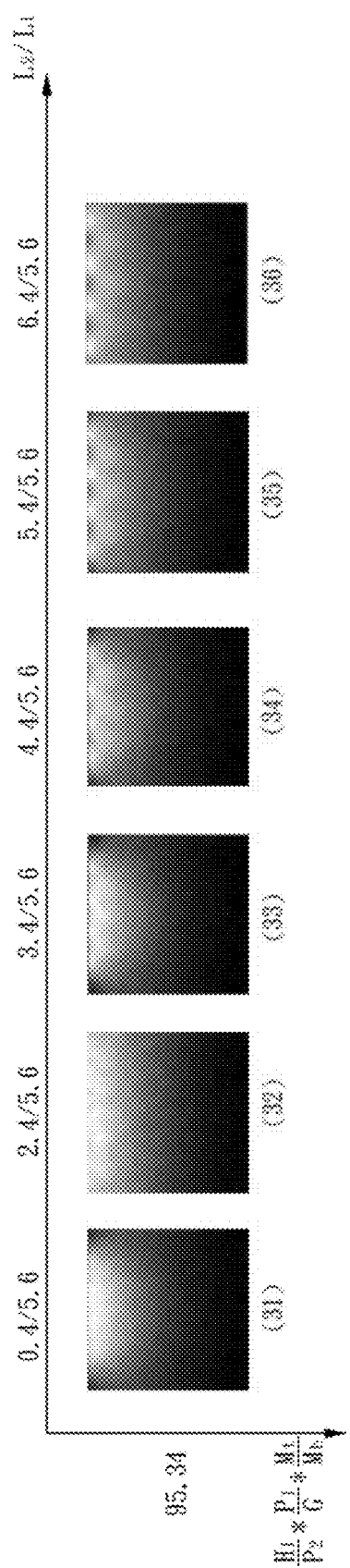
FIG. 8D is experimental result diagram of distinct $L_2/L_1$ values to brightness and dimness alternately.

Moreover, please refer to FIG. 8D, FIG. 8D is experimental result diagram of distinct $L_2/L_1$ values to brightness and dimness alternately. As shown in FIG. 8D, the horizontal axis represents the value of $L_2/L_1$, which respectively reveals 0.4/5.6, 2.4/5.6, 3.4/5.6, 4.4/5.6, 5.4/5.6 and 6.4/5.6; the vertical axis represents the value of $$\frac{H_1}{P_2} * \frac{P_1}{G} * \frac{M_t}{M_b},$$

which reveals 95.34. Then, the optical result of $L_2/L_1$ value versus $$\frac{H_1}{P_2} * \frac{P_1}{G} * \frac{M_t}{M_b}$$

value are plotted, so that existence concerning "Hot Spot phenomenon" can be shown in set (31)~(36), totally six sets. As shown in FIG. 8D, when the value of $L_2/L_1$ is smaller than 5.4/5.6, set (31)~(35), totally five sets, may have better diffusive effectiveness, so that it could pass the quality examination.

Namely:

$$\rightarrow \frac{H_1}{P_2} * \frac{P_1}{G} * \frac{M_t}{M_b} = 95.34 \quad (IV)$$

$$\rightarrow \frac{L_2}{L_1} \leq \frac{5.4}{5.6} = 0.9643 \quad (V)$$

then multiply equation (IV) and (V):

$$\rightarrow \frac{H_1}{P_2} * \frac{P_1}{G} * \frac{M_t}{M_b} * \frac{L_2}{L_1} \leq 91.94 \quad (VI)$$

In the experimental results and aforementioned mathematical derivation, it is shown that the light guide device 12 may have better diffusive effectiveness and so that "Hot Spot phenomenon" will not happen any more if the light guide device 12 and the light sources 19 meet the equations of $$\frac{H_1}{P_2} * \frac{P_1}{G} * \frac{M_t}{M_b} * \frac{L_2}{L_1} \leq 91.94.$$

Therefore, better diffusive efficiency for backlight module may be achieved if the light guide device 12 contains the first microstructures 13, second microstructures 14 and diffusive beads 18 spread inside the light guide device 12.

Figure 7:
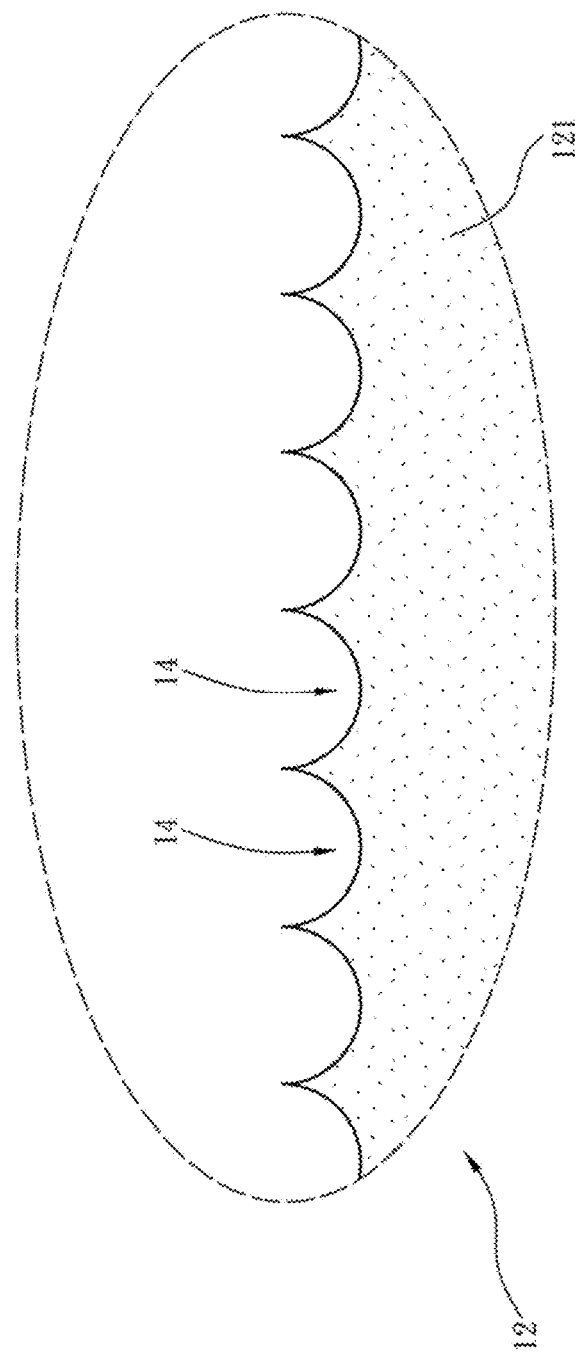
FIG. 7 is diagram of light guide device according to the seventh embodiment of present invention.

Furthermore, the experiments of optical result concerning the second microstructures 14 are also carried out. In the following, the variables of first depth $H_1$, second depth $H_2$ and the expanding angle ($\gamma$) are arranged and combined with respect to the optical efficiency. As shown in FIG. 1A-1C, the expanding angle ($\gamma$) may have better range between 60~110 degree. Afterward, a corrective factor C regarding to the configuration of the second microstructure 14 is defined, wherein $C=H_2/H_1$. Thus, the corrective factor C is the ratio of second depth $H_2$ to first depth $H_1$; and $$0 \leq \frac{H_2}{H_1} \leq 1.0$$

is verified from direct conception. When C=1.0 is established, it means that the base portion 141 becomes a point, the second depth $H_2$ is equal to the first depth $H_1$, and then the second microstructure 14 becomes a triangle sawtooth shaped. When C=0 is established, it means that the value of $H_2$ is zero, the edge portion 142 becomes a point and then the second microstructure 14 becomes a pure arc configuration; in this manner, the light guide device 12 and second microstructures 14 meet equation of C=0 that is depicted in FIG. 7.

Figure 9A:
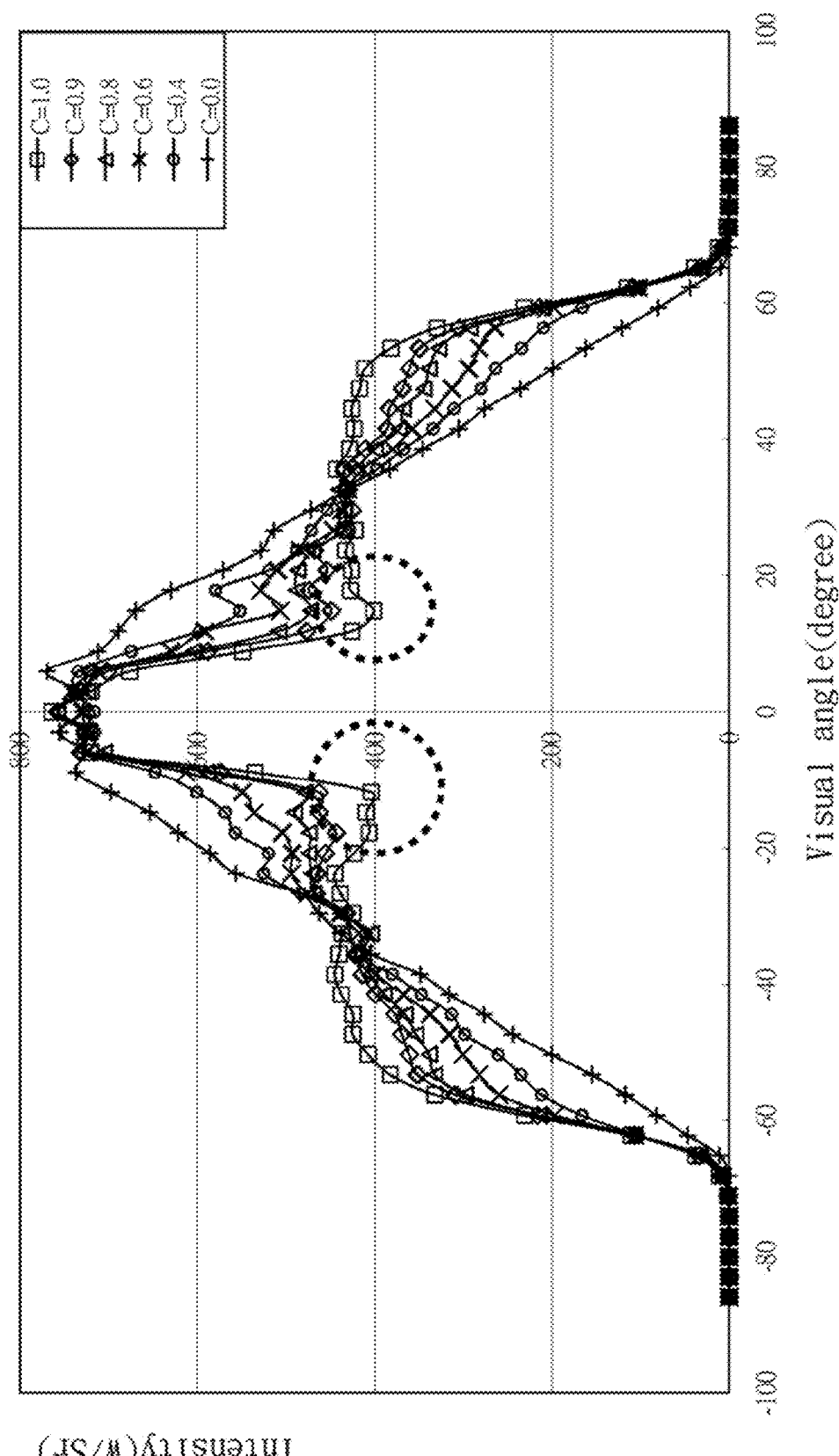
FIG. 9A is optical intensity diagram of light guide device of the first embodiment when expanding angle $\gamma$=60 degree.
Figure 9B:
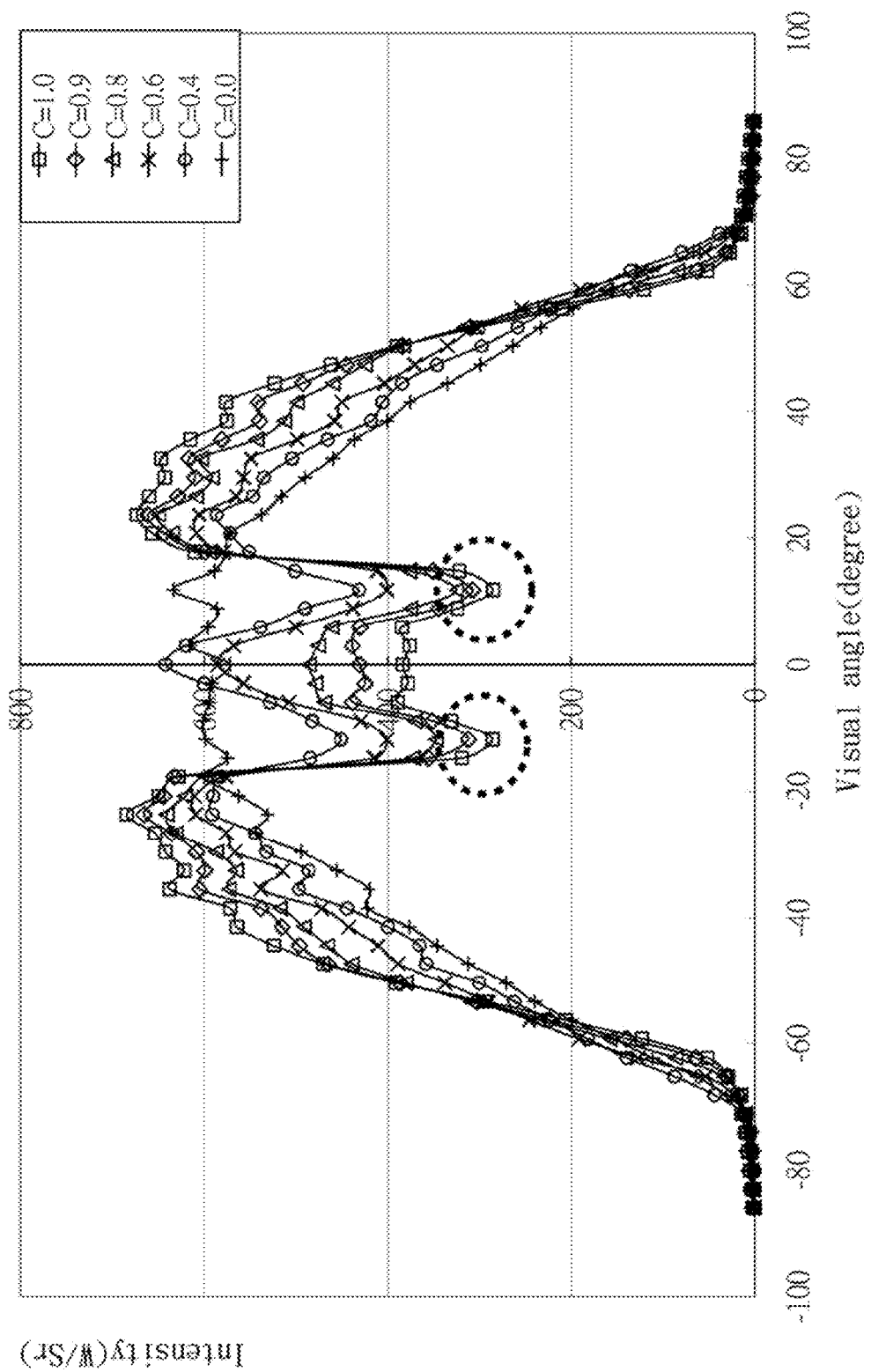
FIG. 9B is optical intensity diagram of light guide device of the first embodiment when expanding angle $\gamma$=110 degree.

Please refer to FIG. 9A-9B, FIG. 9A is optical intensity diagram of light guide device of the first embodiment when expanding angle $\gamma$=60 degree; FIG. 9B is optical intensity diagram of light guide device of the first embodiment when expanding angle $\gamma$=110 degree. As shown in FIG. 9A, distinct corrective factor C may cause different optical effectiveness. When the visual angle is around +15 degree or −15 degree, the light intensity of the experiments of C=0.9 or C=1.0 may approach 400 Watt/Steradian (W/Sr) as dash-circled, comparative to 780 W/Sr in the zero visual angle. The huge difference means greater contrast of brightness and dimness site and obvious "Hot Spot phenomenon". Similarly, as shown in FIG. 9B, a huge difference also reveals in the experiments of C=0.9 or C=1.0 around the same visual angle.

In order to prevent this problem caused in light guide device 12, the corrective factor C is needed to be adjusted, so as to achieve better optical effectiveness. Namely, the brightness and dimness contrast may be reduce by means of $H_2/H_1$ value modulation; which also means adjustment of the second microstructure 14 configuration. In the FIG. 9A~9B, it is shown that the corrective factor is preferable to be C≤0.9.

As described before:

$$\frac{H_1}{P_2} * \frac{P_1}{G} * \frac{M_t}{M_b} \leq 96.0 \quad (III)$$

plus the corrective factor:

$$C = \frac{H_2}{H_1} \leq 0.9 \quad (VII)$$

then multiply equation (III) and (VII):

$$\rightarrow \frac{H_1}{P_2} * \frac{P_1}{G} * \frac{M_t}{M_b} * \frac{H_2}{H_1} \leq 86.4 \quad (VIII)$$

As disclosed, "Hot Spot phenomenon" in light guide device 12 could be diminished or reduced by means of different arrangement for those aforementioned variables. After experiments, the first depth $H_1$, the second depth $H_2$ and the expanding angle ($\gamma$) may be combined so as to fulfill the equation of $$\frac{H_1}{P_2} * \frac{P_1}{G} * \frac{M_t}{M_b} * \frac{H_2}{H_1} \leq 86.4,$$

then the problem may definitely be resolved. In this manner, the optical film 11 (including diffusive film or BEF) is therefore not needed any more.

Figure 2:
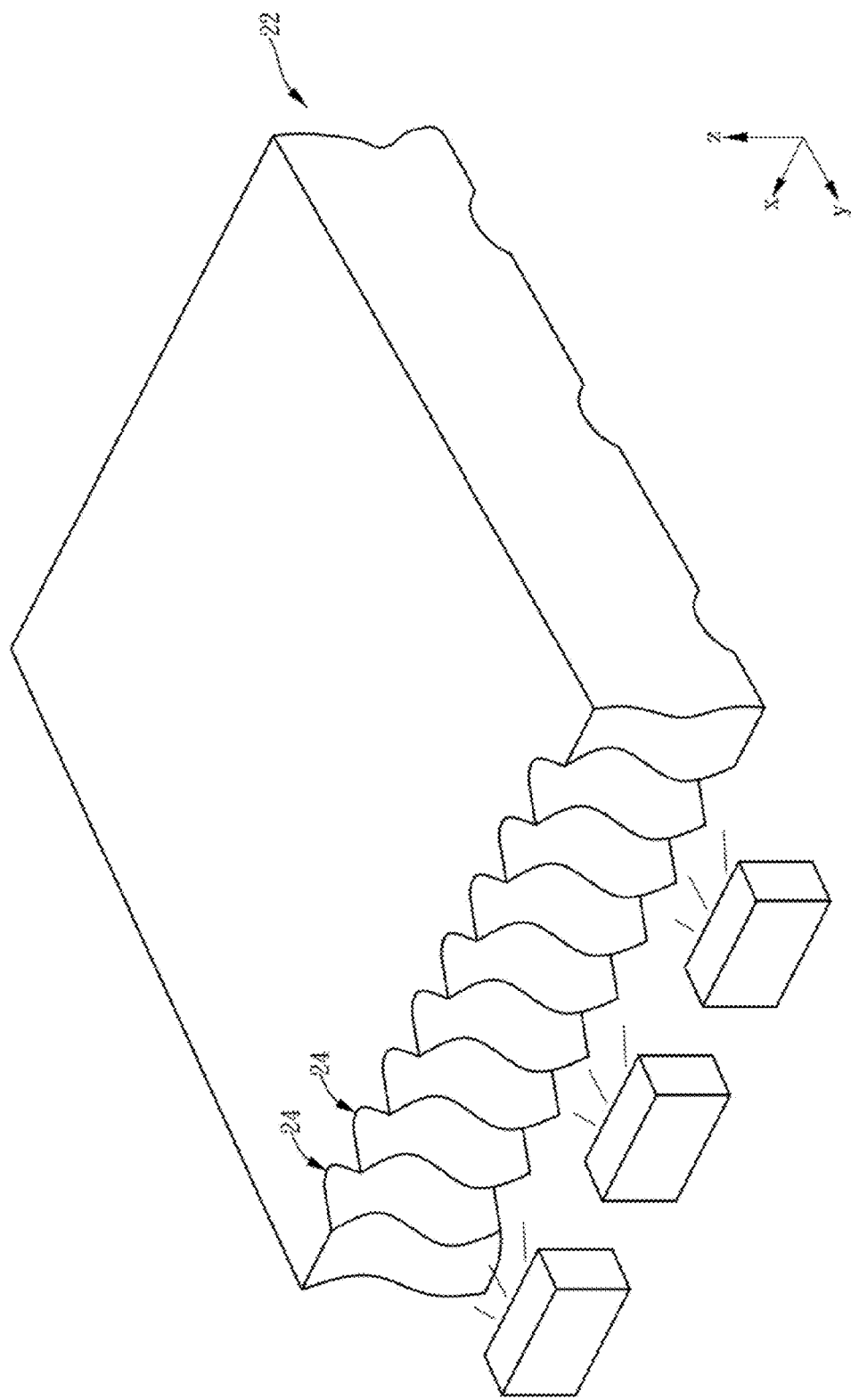
FIG. 2 is diagram of light guide device and backlight module according to the second embodiment of present invention.

There are some other embodiments remained. Please refer to FIG. 2, FIG. 2 is diagram of light guide device and backlight module according to the second embodiment of present invention. As shown in FIG. 2, the light guide device 22 contains pluralities of second microstructures 24, which are twisted column disposed along with the second direction (Z-axis).

Figure 3:
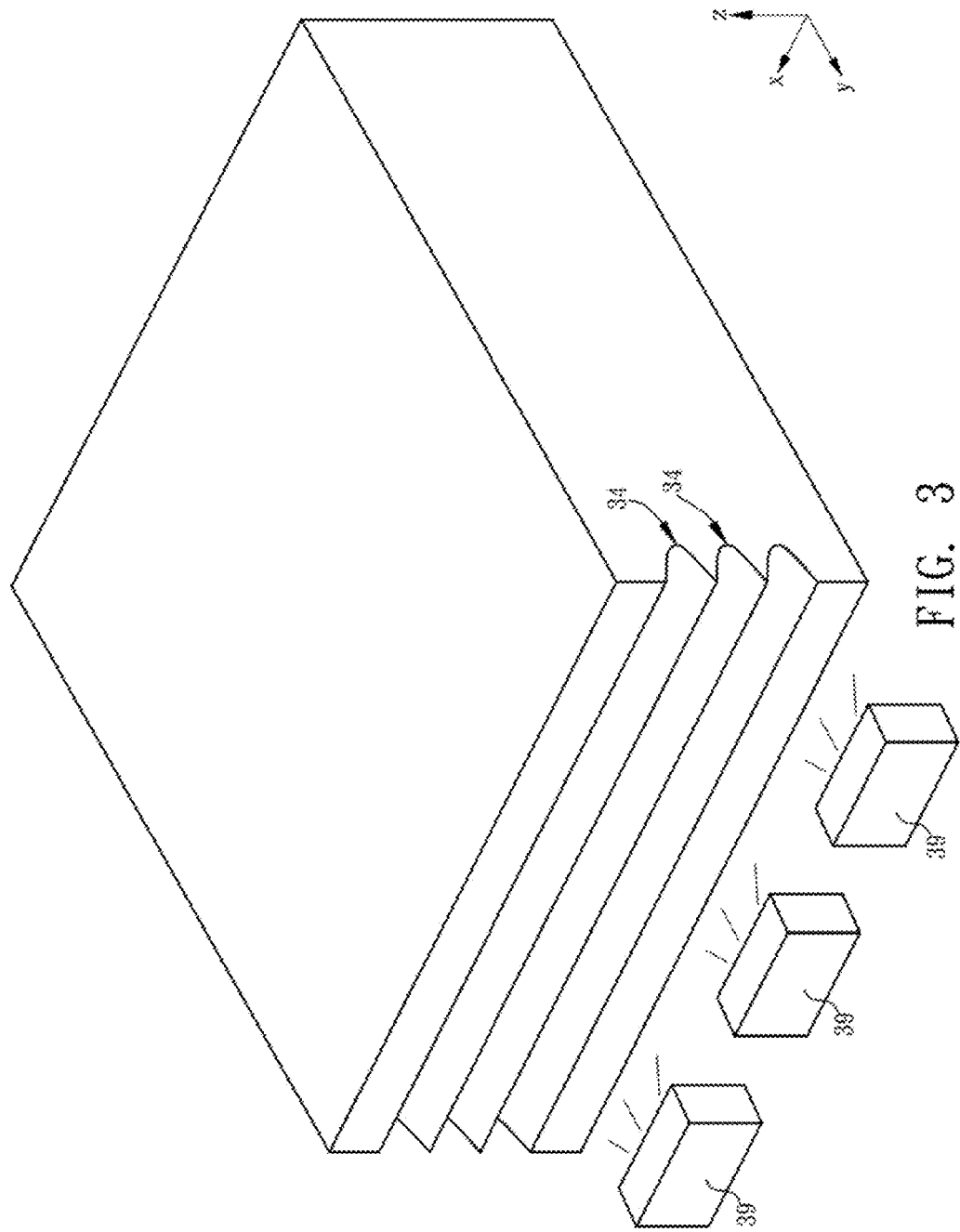
FIG. 3 is diagram of light guide device and backlight module according to the third embodiment of present invention.

Please refer to FIG. 3, FIG. 3 is diagram of light guide device and backlight module according to the third embodiment of present invention. As shown in FIG. 3, the second microstructures 34 are column configurations, and straightly expanded in a line along with the second direction (X-axis). Pluralities of light sources 39 are approximately disposed in a fourth direction (also X-axis), wherein the second direction and the fourth direction are parallel. It is understood that the second direction and the fourth direction might be non-parallel, e.g. having acute angle.

Figure 4:
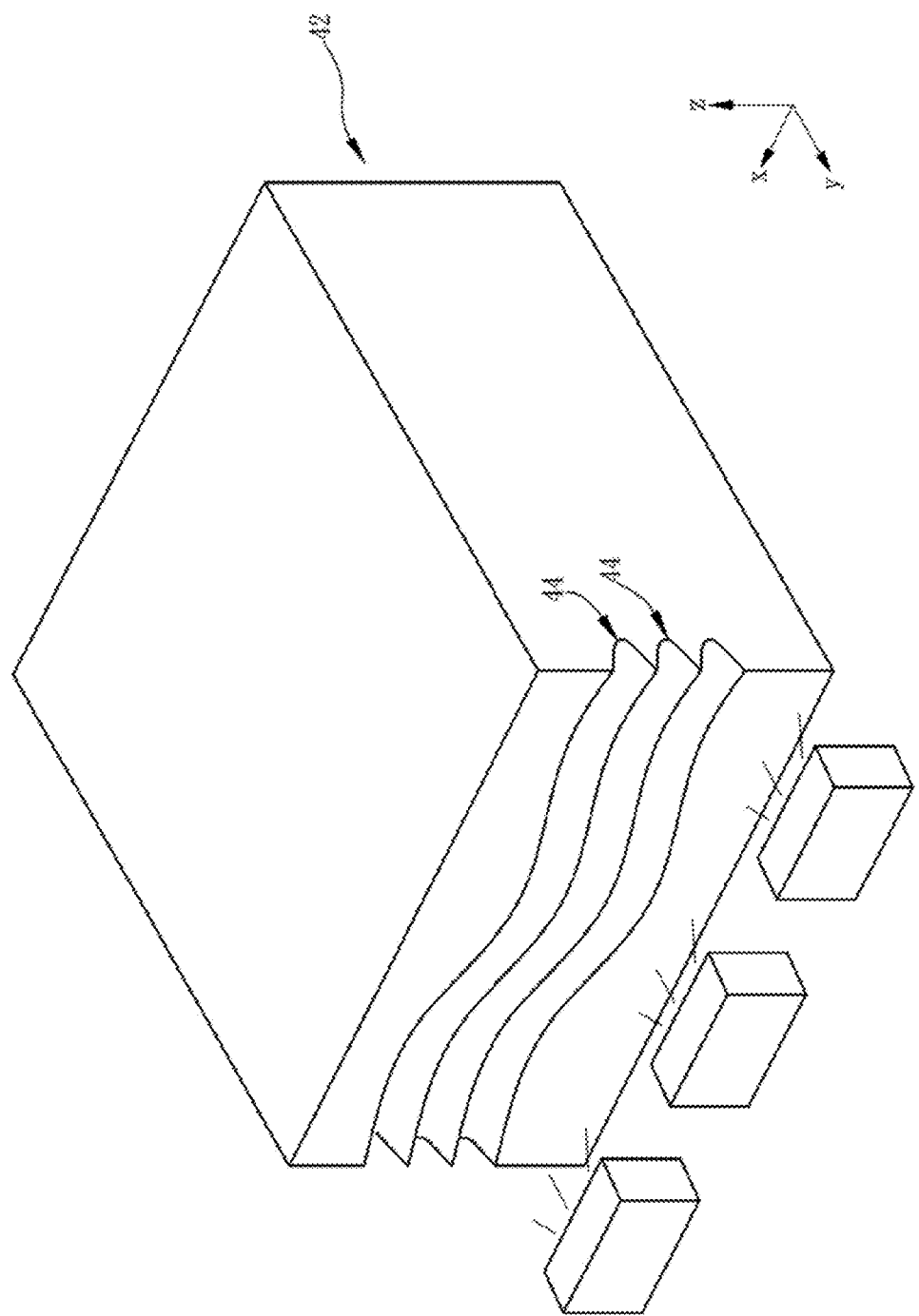
FIG. 4 is diagram of light guide device and backlight module according to the fourth embodiment of present invention.

Please refer to FIG. 4, FIG. 4 is diagram of light guide device and backlight module according to the fourth embodiment of present invention. As shown in FIG. 4, pluralities of the second microstructures 44 of the light guide device 42 are twisted column and extended along with the second direction (X-axis).

Figure 5:
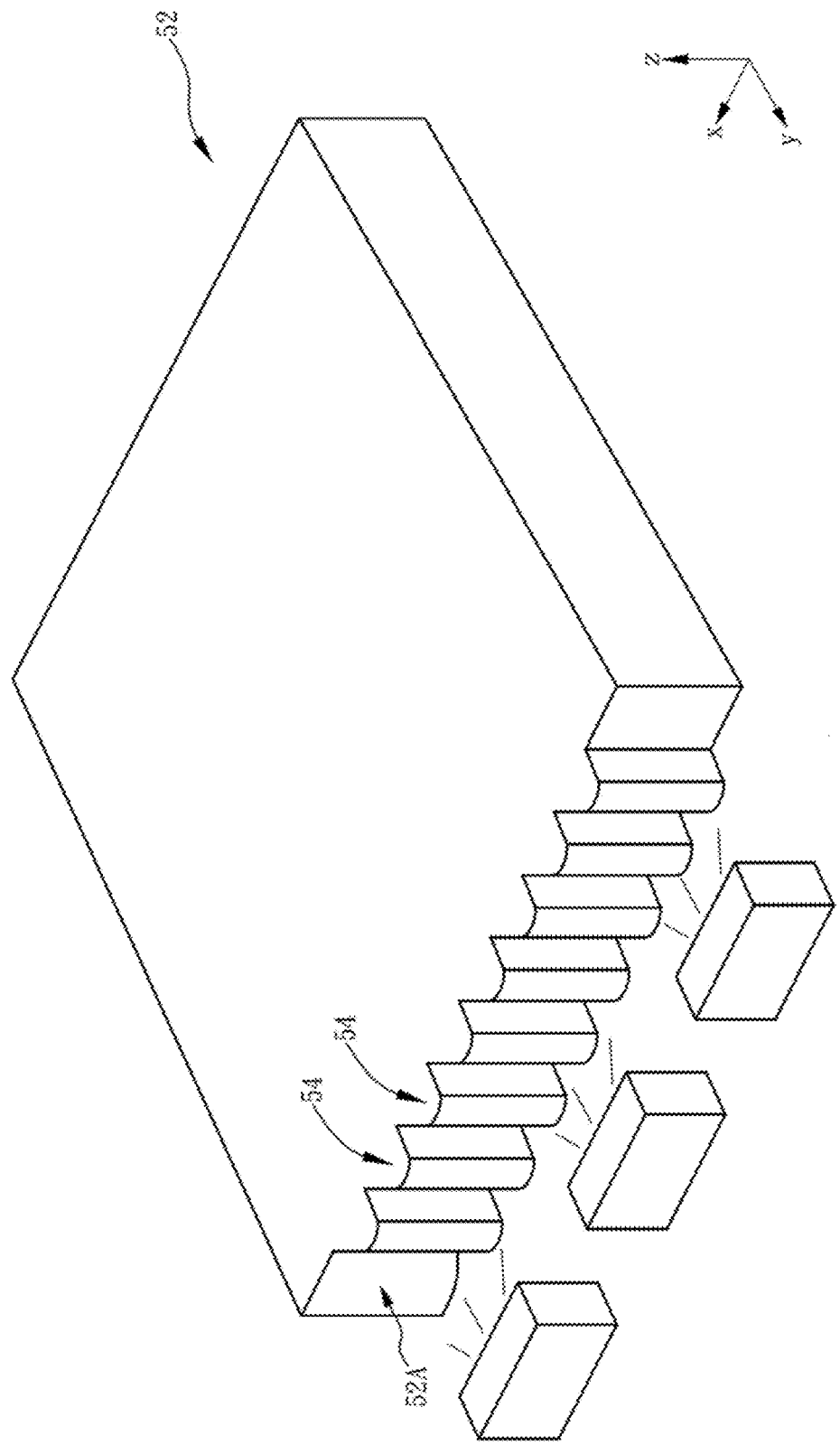
FIG. 5 is diagram of light guide device and backlight module according to the fifth embodiment of present invention.

Please refer to FIG. 5, FIG. 5 is diagram of light guide device and backlight module according to the fifth embodiment of present invention. As shown in FIG. 5, pluralities of the second microstructures 54 of the light guide device 52 are protruded configuration, comparative to the incident surface 52A.

Figure 6:
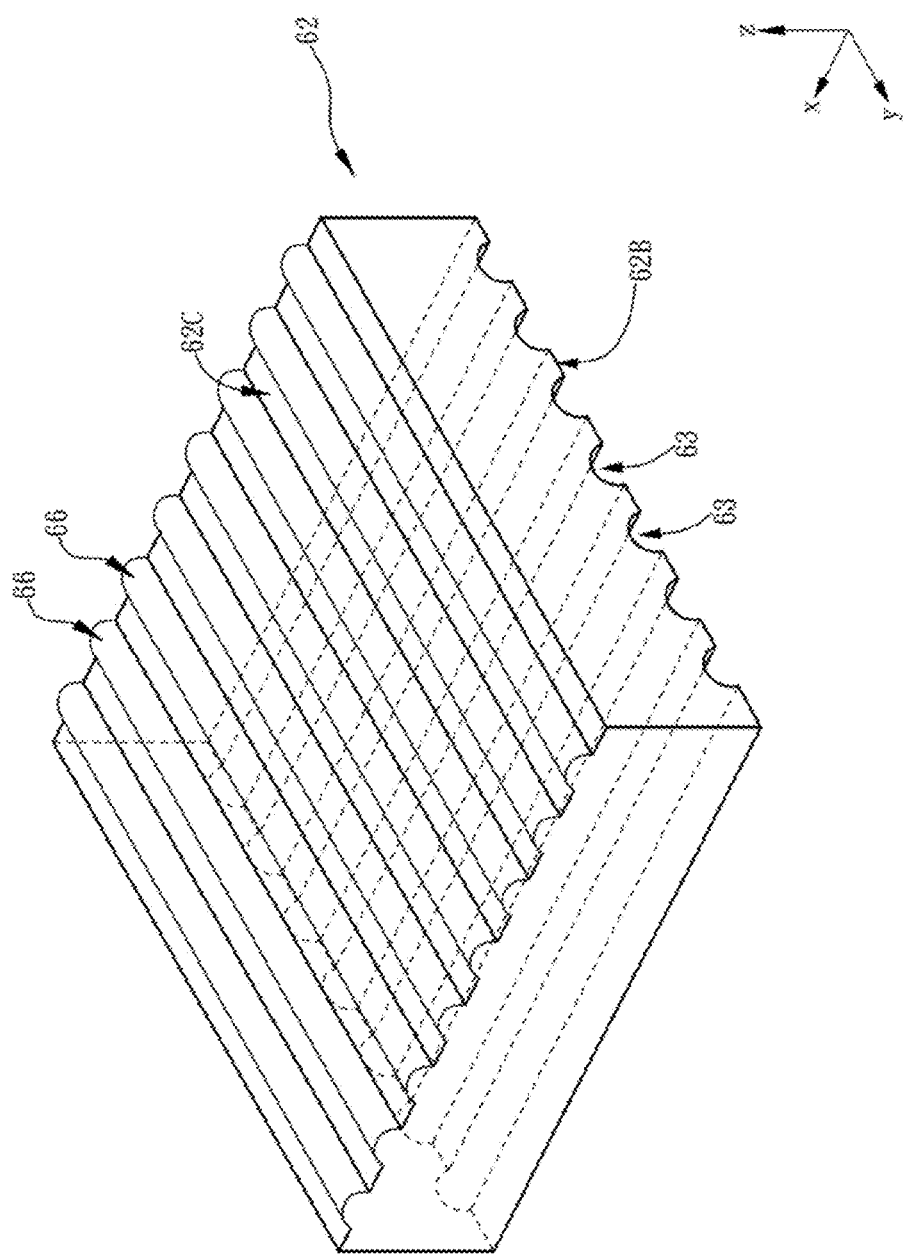
FIG. 6 is diagram of light guide device according to the sixth embodiment of present invention.

Please refer to FIG. 6, FIG. 6 is diagram of light guide device according to the sixth embodiment of present invention. As shown in FIG. 6, the light guide device 62 may further contains pluralities of third microstructures 66 disposed on the emitting surface 62C. The third microstructures 66 straightly expand along with a third direction (Y-axis). Pluralities of first microstructures 62 disposed on the reflective surface 62B are concave curved-section column, and extend in a line along with the first direction (X-axis). The first direction (X-axis) and the third direction (Y-axis) could be non-parallel or orthogonal to each other.

Summarily, the light guide device and its backlight module of present invention do not have necessary to equip with optical film, and then still could have function of light diffusion and mixing. In this manner, the brightness and dimness alternately revealed (some called "Hot Spot phenomenon") in the light guide device or backlight module may be significantly reduced or even diminished.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

We claim:
1. A light guide device, comprising:
a body having an emitting surface, a reflective surface and an incident surface, the reflective surface and the emitting surface being correspondingly disposed on the light guide device, the incident surface being connected to a side of the reflective surface and the emitting surface;
pluralities of first microstructures disposed on the reflective surface, each first microstructure has a first point and a second point defined in cross section wherein the same first microstructure connects to the reflective surface by means of the first point and the second point, the corresponding first point and second point being disposed at two ends of the first microstructure with a first width ($P_1$);
pluralities of flat portions wherein each flat portion is disposed between two adjacent first microstructures and has a gap (G) defined between the same two first microstructures;
pluralities of second microstructures wherein each second microstructure has a base portion and two edge portions defined in cross section, two ends of the base portion being respectively tangent to two edge portion, the second microstructure connecting to the incident surface by means of two edge portions, the corresponding two edge portions having a second width ($P_2$) defined on the incident surface; wherein a first depth ($H_1$) is defined to be the distance between the crossing point of two edge portions away from the incident surface;
pluralities of diffusive beads which have weight $M_b$ spreading inside the body which has weight $M_t$, wherein the equations of

$$\frac{H_1}{P_2} * \frac{P_1}{G} \leq 0.288 \text{ and } \frac{H_1}{P_2} * \frac{P_1}{G} * \frac{M_t}{M_b} \leq 96.0$$

are satisfied.
2. The light guide device as claim 1, wherein the first microstructure extend on a first direction, the emitting surface containing pluralities of third microstructures extending a third direction; wherein the first direction and the third direction are not parallel.
3. The light guide device as claim 1, wherein the light guide device contains pluralities of light sources disposed at side of the incident surface with approximately in a line, the light source having a length $L_1$ and two adjacent light sources having, an interval $L_2$, wherein the equation of $$\frac{H_1}{P_2} * \frac{P_1}{G} * \frac{M_t}{M_b} * \frac{L_2}{L_1} \leq 91.94$$

is satisfied.
4. The light guide device as claim 3, wherein the second microstructure extends on a second direction and pluralities of light sources are disposed in a fourth direction, wherein the second direction and the fourth direction are parallel or orthogonal.
5. The light guide device as claim 4, wherein the second microstructures are twisted disposed along with the second direction.
6. The light guide device as claim 1, wherein the base portion is curved shaped, or the edge portion is straight.

7. The light guide device as claim 1, wherein the base portion is circular arc and has expanding angle (γ) between 60~110 degree.

8. The light guide device as claim 1, wherein the light guide device has a second depth ($H_2$) defined to be the projecting length from the edge portion to the normal line of the incident surface; wherein $$\frac{H_1}{P_2} * \frac{P_1}{G} * \frac{M_t}{M_b} * \frac{H_2}{H_1} \leq 86.4 \text{ and } 0 \leq \frac{H_2}{H_1} \leq 1.0$$

are satisfied.

9. The light guide device as claim 1, wherein the first microstructures are dilute arranged in neighboring of the light source.

10. The light guide device as claim 1, wherein the first microstructures are concave or protruded structures, and the second microstructures are concave or protruded structures.

11. A backlight module, comprising:
a light guide device;
pluralities of light sources disposed with approximately in a line and emitting the light ray so as to form an optical path;
at least one optical film;
wherein the light guide device further contains a body, pluralities of first microstructures, pluralities of second microstructures, pluralities of flat portions and pluralities of diffusive beads; the body having an emitting surface, a reflective surface and an incident surface, the reflective surface and the emitting surface being correspondingly disposed on the light guide device, the incident surface being connected to a side of the reflective surface and the emitting surface, the first microstructures disposed on the reflective surface, each first microstructure has a first point and a second point defined in cross section wherein the same first microstructure connects to the reflective surface by means of the first point and the second point, the corresponding first point and second point being disposed at two ends of the first microstructure with a first width ($P_1$), each flat portion disposed between two adjacent first microstructures and having a gap (G) defined between the same two first microstructures, each second microstructure having a base portion and two edge portions defined in cross section, two ends of the base portion being respectively tangent to two edge portion, the second microstructure connecting to the incident surface by means of two edge portions, the corresponding two edge portions having a second width ($P_2$) defined on the incident surface; wherein a first depth ($H_1$) is defined to be the distance between the crossing point of two edge portions away from the incident surface; pluralities of diffusive beads which have weight $M_b$ spreading inside the body which has weight $M_t$, wherein the equations of $$\frac{H_1}{P_2} * \frac{P_1}{G} \leq 0.288 \text{ and } \frac{H_1}{P_2} * \frac{P_1}{G} * \frac{M_t}{M_b} \leq 96.0$$

are satisfied;
whereby the light sources are disposed at side of the incident surface and the optical film is disposed at side of the emitting surface, so that the optical path passes through the light guide device and the optical film in order.

12. The backlight module as claim 11, wherein the first microstructure extend on a first direction, the emitting surface containing pluralities of third microstructures extending a third direction; wherein the first direction and the third direction are not parallel.

13. The backlight module as claim 11, wherein the backlight module contains pluralities of light sources disposed at side of the incident surface with approximately in a line, the light source having a length $L_1$ and two adjacent light sources having an interval $L_2$, wherein the equation of $$\frac{H_1}{P_2} * \frac{P_1}{G} * \frac{M_t}{M_b} * \frac{L_2}{L_1} \leq 91.94$$

is satisfied.

14. The backlight module as claim 13, wherein the second microstructure extends on a second direction and pluralities of light sources are disposed in a fourth direction, wherein the second direction and the fourth direction are parallel or orthogonal.

15. The backlight module as claim 14, wherein the second microstructures are twisted disposed along with the second direction.

16. The backlight module as claim 11, wherein the base portion is curved shaped, or the edge portion is straight.

17. The backlight module as claim 11, wherein the base portion is circular arc and has expanding angle (γ) between 60~110 degree.

18. The backlight module as claim 11, wherein the backlight module has a second depth ($H_2$) defined to be the projecting length from the edge portion to the normal line of the incident surface; wherein $$\frac{H_1}{P_2} * \frac{P_1}{G} * \frac{M_t}{M_b} * \frac{H_2}{H_1} \leq 86.4 \text{ and } 0 \leq \frac{H_2}{H_1} \leq 1.0$$

are satisfied.

19. The backlight module as claim 11, wherein the first microstructures are dilute arranged in neighboring of the light source.

20. The backlight module as claim 11, wherein the first microstructures are concave or protruded structures, and the second microstructures are concave or protruded structures.

21. The backlight module as claim 11, wherein the density of the diffusive bead is higher in the neighboring of the emitting surface or the reflective surface than the average density of the body.

* * * * *